Figure 1:
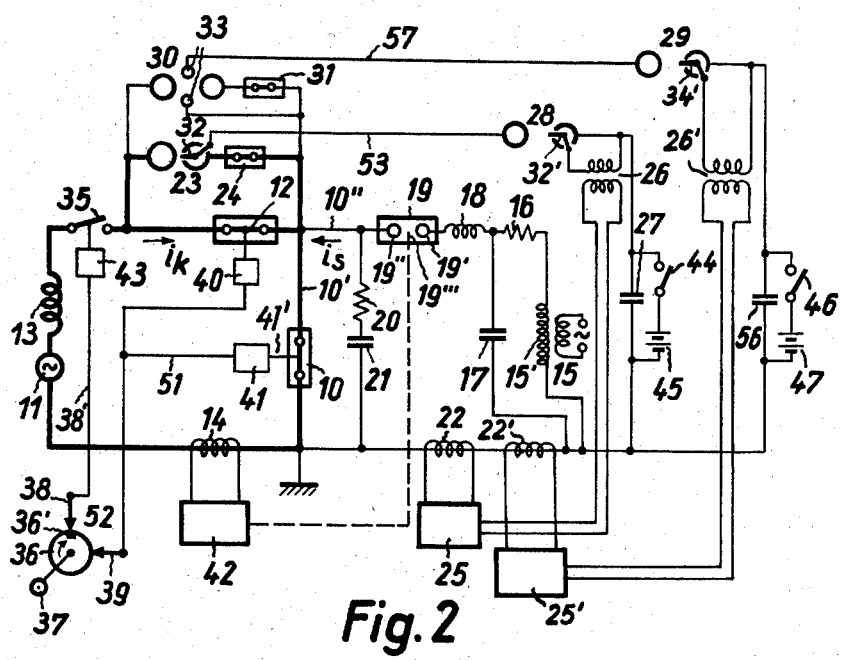

Aug. 4, 1959    E. SLAMECKA ET AL    2,898,548

TESTING APPARATUS

Filed May 23, 1955

Inventor:
Ernst Slamecka
August Hochrainer
BY Michael S. Striker
Attorney

United States Patent Office 2,898,548
Patented Aug. 4, 1959

2,898,548

TESTING APPARATUS

Ernst Slamecka and August Hochrainer, Kassel, Germany, assignors to Licentia Patent-Verwaltungs G.m.b.H., Hamburg, Germany Application May 23, 1955, Serial No. 510,226

4 Claims. (Cl. 324—28)

The present invention relates to testing apparatus. More particularly, it relates to apparatus for testing switches or circuit breakers under simulated operating conditions for their circuit interrupting capacities.

For testing switches or circuit breakers adapted to be used in high current and high voltage circuits, it is necessary to submit these circuit breakers to simulated operating conditions. Therefore, a high current is passed through the closed circuit breaker and a high voltage is applied across the contacts of the open circuit breaker. It is obviously uneconomical to use a single source for supplying both the high voltage and the high current since such a source would have to supply a substantial amount of power.

Accordingly, it is conventional to test such switches or circuit breakers with separate current and voltage sources. The circuit breaker may be connected in series with the high current source so that a high current can be applied through the closed circuit breaker. The circuit breaker is then opened and high voltage from the separate high voltage source is applied across the open contacts of the circuit breaker under test. In the event the area between the open contacts of the circuit breaker has not been sufficiently deionized, the high voltage applied thereacross may cause a voltage breakdown between the open contacts. Under normal operating conditions such a breakdown would immediately re-apply a short circuit current through the circuit breaker.

Accordingly, in order to simulate actual operating conditions, it is necessary to re-apply the high current from the high current source in the event of a voltage breakdown across the open contacts of the circuit breaker. However, the testing circuit must be arranged so that there is no possibility of the high voltage from the separate voltage source being applied across the current source.

Also, under actual operating conditions the polarity of the voltage to which the open contacts of a circuit breaker are submitted is reversed from the polarity of the current that has passed through the closed circuit breaker just prior to the opening thereof. Therefore, the polarity of the applied high voltage in the testing apparatus must be properly adjusted if the circuit breaker under test is to be tested under actual operating conditions.

Accordingly, it is an object of the present invention to provide a new and improved apparatus for testing circuit breakers under actual working conditions.

Another object of the present invention is to provide a new and improved apparatus for testing circuit breakers for their high voltage and current capacities.

A further object of the present invention is to provide an apparatus for testing high power circuit breakers wherein the high current is automatically re-applied through the circuit breaker whenever the open contacts thereof break down under the applied high voltage.

With the above objects in view, the present invention mainly consists of an apparatus for testing circuit breakers by means of a separate high voltage and high current source including a testing branch circuit adapted to contain the switch to be tested, a high current circuit including a high alternating-current source connected to the testing branch circuit, a high voltage circuit containing a high voltage source connected to the testing branch circuit, an auxiliary switch in the high current circuit intended to prevent application of high voltage to the high current source, means for closing the auxiliary switch and the circuit breaker under test so that high alternating-current flows from the high current source through the closed auxiliary switch and circuit breaker, means for opening the contacts of the auxiliary switch and the contacts of the circuit breaker under test, [shortly before the high alternating-current passes through zero] means for applying high voltage from the high voltage source across the open contacts of the circuit breaker under test, and means for re-applying current from the high current source through the circuit breaker under test in the event the high voltage causes a voltage breakdown between the open contacts of the circuit breaker.

Figure 2:
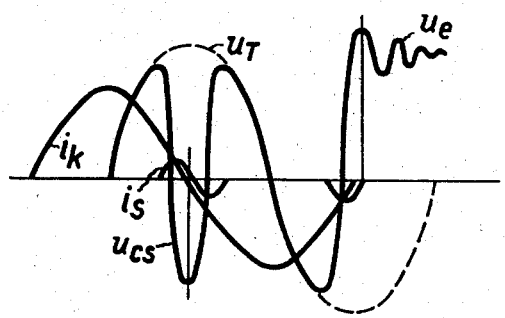

The novel features which are considered as characteristic for the invention are set forth in particular in the apended claims. The invention itself, however, both as to its construction and its method of operation, together with additional objects and advantages thereof, will be best understood from the following description of specific embodiments when read in connection with the accompany drawings, in which:

Fig. 1 is a schematic wiring diagram of one embodiment of apparatus capable of carrying out the method of the present invention; and Fig. 2 is a graphical representation of the wave shapes of the various current and voltages applied to the circuit breaker under test showing the phase relationship therebetween.

Referring now to the figures and more particularly to Fig. 1, the switch or circuit breaker 10 to be tested is connected in series with a conductor 10' which forms the testing branch circuit and has one side thereof connected to ground. The circuit breaker 10 is mechanically coupled to an actuator 41 which can be operated to open or close the circuit breaker 10 upon being energized. The actuator 41, for example, may be a solenoid coil having a plunger 41' connected to the circuit breaker 10 and which is attracted into the solenoid coil or projected therefrom depending upon whether or not the solenoid is energized.

Actuator 41 is connected by conductor 51 to a fixed contact 39 of a motor driven switch 52. The switch 52 has a rotating armature 36 connected to a synchronous motor 37. On the outer surface of the armature 36 is a contact 36' which upon rotation of the armature makes contact with the fixed contact 39 once per revolution. The switch 52 has a second fixed contact 38 which first mates with contact 36' if the armature rotates in a clockwise direction.

The fixed contact 38 is connected through conductor 38' to a second actuator 43 which is mechanically coupled to a starting switch 35 in the high current testing circuit. Also connected in the high current testing circuit is the high current source 11, a choke coil 13, an auxiliary switch 12 and a pickup coil 14. The auxiliary switch 12 is connected to an actuator 40 which is similar to the actuator 41 and is electrically connected thereto so as to be energized simultaneously therewith.

In operation, the synchronous motor 37 is energized to rotate the armature 36 of the switch 52. When the moving contact 36' of switch 52 makes contact with the fixed contact 38 thereof, the actuator 43 is energized to close the starting switch 35. This permits a high alternating testing current $i_k$ to flow from the source 11 through the closed switches 35, 12 and 10. This submits the circuit breaker 10 to the high alternating test current for a time period depending upon the speed of rotation of the switch 52 and the location of the fixed contact 39 with respect to the fixed contact 38. When the moving contact 36' makes electrical contact with the fixed contact 39, actuators 40 and 41 are simultaneously actuated to open the auxiliary switch 12 and the circuit breaker 10 under test. This completes the high current testing of the circuit breaker 10 and permits high voltage to be applied across the open contacts thereof.

The high voltage testing circuit is connected to the testing circuit branch 10', on the right hand side thereof in Fig. 1. The high voltage is obtained from a high voltage transformer 15 whose primary is connected to the high current source 11 so that the high voltage to be applied is in the proper phase with the testing current. The secondary winding 15' of transformer 15 has one end connected to ground and the other end thereof connected to one side of a resistor 16. The other side of resistor 16 is connected to one terminal of a capacitor 17 and an inductance 18. The other terminal of the capacitor 17 is connected to ground and the other side of inductance 18 is connected to one main electrode 19' of a controllable spark gap 19. The other main electrode 19" of the spark gap 19 is connected to one side of resistor 20 and through conductors 10" and 10' to one side of the switch 10 under test. The other side of resistor 20 is connected to ground through a capacitor 21. Completing the high voltage testing circuit is a pickup coil 22.

The controllable spark gap 19 is normally in a discharge-preventing condition which presents an open circuit to the high voltage testing circuit. Discharge of the spark gap 19 may be initiated by an auxiliary electrode 19''' which is connected to the pickup coil 14 in the high current testing circuit through a pulse amplifier 42. The operation of the controllable spark gap and the initiation of a discharge therein by the auxiliary electrode is fully described in the copending United States patent application by W. Herbst and C. Bloemeke, Serial No. 491,590.

Since the spark gap 19 normally presents an open circuit to the high voltage testing circuit, the high voltage obtained from the secondary winding 15' cannot be applied to the circuit breaker 10 under test. However, when the testing current $i_k$ reaches a predetermined magnitude a voltage impulse is produced in the pickup coil 14, which impulse is amplified by pulse amplifier 42 and applied to the auxiliary starting electrode 19''' of the spark gap 19.

This permits an alternating current, $i_s$, to be superimposed on the alternating testing current flowing through the opened circuit breaker 10. When the current, $i_s$, reaches its null-point, its high driving voltage is applied across the open contacts thereof to submit the circuit breaker to the desired high testing voltage and accordingly measure the interrupting capacity of the circuit breaker.

From the above, it can be seen that the circuit breaker 10 is tested both for its high current capacity and for its high voltage breakdown characteristics by independent high current and high voltage sources. It is clear that these independent sources must be arranged so that there is no possibility of the high alternating current flowing into the high voltage testing circuit, or the high voltage being applied to the high current source. The spark gap 19 prevents high current from flowing in the high voltage circuit when the switches 35 and 12 are closed and the opening of the auxiliary switch 12 prevents the application of a high voltage to the high current source after the circuit breaker 10 is opened.

However, under actual operating conditions it is possible for the high voltage applied across the open or opening contacts of the circuit breaker to cause a voltage breakdown therebetween. In actual operating conditions, this would result in a reapplication of a high current, usually a short circuit current, throughout the circuit breaker 10. However, if the auxiliary switch 12 remains open, it can be seen that high current flowing from the source 11 cannot be reapplied to the switch 10 unless additional circuit components are provided.

In accordance with the principles of the present invention, the additional circuit components include elements placed in parallel with the auxiliary switch 12 of the high current testing circuit. These elements are a controllable spark gap 23 connected in series with a circuit breaker 24. The controllalbe spark gap 23 includes an auxiliary starting electrode 32 which is connected through a conductor 53 to one main electrode of a controllable spark gap 28.

The spark gap 28 has an auxiliary starting electrode 32' connected to the secondary winding of a transformer 26 whose primary winding is connected across the output of a pulse amplifier 25. The input of the amplifier 25 is connected to the pickup coil 22 in the high voltage testing circuit. The secondary winding of the transformer 26 is also connected to one terminal of a capacitor 27 the other terminal of which is connected to ground. Across the capacitor 27 is connected a charging circuit including a direct-current source 45 and a switch 44. When the switch 44 is closed, the capacitor 27 is charged to a voltage equal to the voltage of the source 45.

In operation, with the additional circuit components described hereinabove, if a discharge occurs across the open contacts of the circuit breaker 10 under test, due to the application of the high voltage thereacross, the alternating current $i_s$ will flow through the high voltage circuit producing a voltage impulse in the pickup coil 22. This impulse is amplified in the pulse amplifier 25 and applied to the auxiliary starting electrode 32' of the controllable spark gap 28. This amplified impulse initiates a breakdown in the spark gap 28 between the right-hand electrode thereof and the auxiliary electrode 32' so as to ionize the spark gap 28 and thus providing a discharge path for the charged capacitor 27 and causing the voltage thereacross to be applied to the starting electrode 32 of the spark gap 23 thus creating a discharge between the starting electrode 22 and the right-hand electrode of spark gap 23 which is connected at this moment via circuit breaker 24, branch 10', the tested circuit breaker 10 and ground to the condenser 27. This initiates a discharge in the now ionized spark gap 23 providing a path for current by-passing the breaker 12 and flowing from the alternating current source 11 through the branch 10' and the switch 10.

Accordingly, the high testing current is reapplied to the circuit breaker 10 when it has broken down. The reapplication of this testing current ceases when the circuit breaker 24 opens. The circuit breaker 24 will open a predetermined time after current starts to flow therethrough. In the event the opened circuit breaker 10 again breaks down after the cessation of the re-applied testing current, the current $i_s$ will continue to flow in the high voltage testing circuit. Accordingly, an additional pickup coil 22' is arranged in the high voltage testing circuit similar to the coil 22 to initiate discharge in a controllable spark gap 29 by means of an impulse amplifier 25' and a transformer 26' having its secondary connected to an auxiliary starting electrode 34' associated with the right-hand electrode of spark gap 29, quite similarly as described for the circuit 22, 25, 26, 32'. When the spark gap 29 discharges, voltage from the capacitor 56 (charged by the auxiliary means 46, 47) will be applied through the ionized spark gap 29 and conductor 57 to auxiliary starting electrode 33 of a spark gap 30. This will cause the spark gap 30 to discharge and provide another path for current to flow from the high current source 11 through the circuit breaker 10 that has broken down. This reapplication of testing current will stop when the circuit breaker 31 opens after the desired time interval.

It is clear that additional parallel circuit components for the auxiliary switch 12 in the high current testing circuit similar to the type described hereinabove may be provided, if desired.

If the auxiliary switch 12 were not used in the high current testing circuit, current from the high current source 11 could flow through the switch 10 every time this switch breaks down due to the applied high voltage. In such an arrangement, if a high voltage of a high alternating frequency is applied, the choke 13 will provide an effectively high impedance and prevent the application of high voltage to the high current source. However, in accordance with the present invention it is possible to use an auxiliary switch 12 and still permit the reapplication of testing current. It is apparent that this permits a much lower frequency high voltage to be used.

Referring now to Fig. 2, the phase relationship between the applied testing currents and voltages are shown. From this figure it can be seen that the alternating current $i_s$ is superimposed on the high testing current $i_k$ shortly before the current $i_k$ passes through a null-point. This current $i_s$ is obtained from the capacitor 17 which has been charged by the high voltage $u_T$ applied from the transformer 15. When the alternating current $i_s$ reaches its null-point, a sharp voltage increase is applied across the elements 20 and 21 of the high voltage testing circuit and therefrom to the circuit breaker 10 under test which has just been opened.

If the application of this high voltage causes a breakdown or a reignition between the open contacts of the switch 10, a second half-wave of the alternating current $i_s$ will flow. As described above, this second half-wave will induce a voltage impulse in the pickup coil 22 and cause the bridging of the auxiliary switch 12. This permits a second half-wave of the high testing current $i_k$ to flow through the switch 10. Shortly before the null-point of this second half-wave of the testing current, the operation of the additional pick up coils will cause the current $i_s$ to again be superimposed thereon. If the open contacts of the switch are now sufficiently apart, and this switch does not break down the testing voltage will take the shape of the transient voltage $u_e$.

From this arrangement it can be seen that the applied testing voltage always has a polarity which is opposite to the polarity of the last half-wave of the applied testing current. This corresponds to actual operating conditions wherein the high voltage applied to the opened circuit breaker, in a purely inductive circuit, is 90° out of phase with the short circuit current.

It will be understood that each of the elements described above, or two or more together, may also find a useful application in other types of testing apparatus differing from the types described above.

While the invention has been illustrated and described as embodied in switch testing apparatus, it is not intended to be limited to the details shown, since various modifications and structural changes may be made without departing in any way from the spirit of the present invention.

Without further analysis, the foregoing will so fully reveal the gist of the present invention tha others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for testing circuit breakers by means of a separate high voltage and high current source comprising, in combination, a testing branch circuit adapted to contain the switch to be tested; a high current circuit including a high alternating-current source connected to said testing branch circuit; a high voltage circuit containing a high voltage source connected to said testing branch circuit; an auxiliary switch in said high current circuit intended to prevent application of high voltage to said high current source; a plurality of controllable spark gaps connected in parallel across said auxiliary switch, each of said spark gaps being normally in undischarged condition; means for closing said auxiliary switch and the circuit breaker under test so that high alternating-current flows from said high current source through said closed auxiliary switch and circuit breaker; means for substantially simultaneously opening the contacts of said auxiliary switch and the contacts of the circuit breaker under test while alternating current is flowing therethrough; means for applying high voltage from said high voltage source across the open contacts of the circuit breaker under test shortly before the high alternating current passes through zero; means, including a source of energy independent of said high current and high voltage sources, for initiating a discharge in one of said controllable spark gaps, while said contacts of said auxiliary switch remain open, in the event the high voltage applied across the open contacts of the circuit breaker under test causes a voltage breakdown therebetween so that current from said high current source will be reapplied through the circuit breaker under test; and means, including a source of energy independent of said high current and high voltage sources, for successively initiating a discharge in each of said remaining spark gaps, while said contacts of said auxiliary switch remain open, in the even the open contacts of the circuit breaker under test continue to break down after the continued re-applications of the high alternating current.

2. In an apparatus for testing electrical circuit breakers by means of separate high current and high voltage sources, wherein an auxiliary switch is connected in circuit between the circuit breaker and the separate high current source, the auxiliary switch and the circuit breaker under test being closed when the high testing current passes through the circuit breaker, the auxiliary switch and the circuit breaker under test being opened, in combination means for applying a high voltage across the terminals of the circuit breaker under test shortly before the high alternating current passes through zero; and means, including a source of energy independent of said high current and high voltage sources, for automatically short circuiting the terminals of the auxiliary switch while said contacts of said auxiliary switch remain open, in the event of a discharge between the open contacts of the circuit breaker under test.

3. An apparatus for testing circuit breakers by means of a separate high voltage and high current source comprising, in combination, a testing branch circuit adapted to contain the switch to be tested; a high current circuit including a high alternating-current source connected to said testing branch circuit; a high voltage circuit containing a high voltage source connected to said testing branch circuit; an auxiliary switch in said high current circuit intended to prevent application of high voltage to said high current source; means for closing said auxiliary switch and the circuit breaker under test so that high alternating-current flows from said high current source through said closed auxiliary switch and circuit breaker; means for substantially simultaneously opening the contacts of said auxiliary switch and the contacts of the circuit breaker under test while alternating current is flowing therethrough; means for applying high voltage from said high voltage source across the open contacts of the circuit breaker under test shortly before the high alternating current passes through zero; means, including a source of energy independent of said high current and high voltage sources, for re-applying current from said high current source through said circuit breaker under test, while said contacts of said auxiliary switch remain open, in the event the high voltage causes a voltage breakdown between the open contacts of said circuit breaker; means, including a source of energy independent of said high current and high voltage sources, for re-applying current from said high current source through said circuit breaker under test, while said contacts of said auxiliary switch remain open, each time the high voltage causes a voltage breakdown between the open contacts of said circuit breaker; and means for re-applying high voltage from said high voltage source across the open contacts of the circuit breaker under test each time the current re-applied from said high current source passes through zero.

4. An apparatus for testing circuit breakers by means of a separate high voltage and high current source comprising, in combination, a testing branch circuit adapted to contain the switch to be tested; a high current circuit including a high alternating-current source connected to said testing branch circuit; a high voltage circuit containing a high voltage source connected to said testing branch circuit; an auxiliary switch in said high current circuit intended to prevent application of high voltage to said high current source; means for closing said auxiliary switch and the circuit breaker under test so that high alternating-current flows from said high current source through said closed auxiliary switch and circuit breaker; means for substantially simultaneously opening the contacts of said auxiliary switch and the contacts of the circuit breaker under test while alternating current is flowing therethrough; means for applying high voltage from said high voltage source across the open contacts of the circuit breaker under test shortly before the high alternating current passes through zero; means for re-applying current from said high current source through said circuit breaker under test, while said contacts of said auxiliary switch remain open, in the event the high voltage causes a voltage breakdown between the open contacts of said circuit breaker; means, including a source of energy independent of said high current and high voltage sources, for re-applying current from said high current source through said circuit breaker under test, while said contacts of said auxiliary switch remain open, each time the high voltage causes a voltage breakdown between the open contacts of said circuit breaker; and means, including a source of energy independent of said high current and high voltage sources, for re-applying high voltage from said high voltage source across the open contacts of the circuit breaker under test each time the current re-applied from said high current source passes through zero, the polarity of the high voltage re-applied across said open contacts being opposite to the polarity of the last half-wave of alternating current re-applied through said circuit breaker.

References Cited in the file of this patent

UNITED STATES PATENTS

| | | |
|---|---|---|
| 2,120,873 | Skeats | June 14, 1938 |
| 2,173,706 | Biermanns | Sept. 19, 1939 |
| 2,222,711 | Grosse | Nov. 26, 1940 |
| 2,508,954 | Latour et al. | May 23, 1950 |